United States Patent [19]

Cockerell

[11] 4,133,282

[45] Jan. 9, 1979

[54] CUSHION SEALS FOR AIR CUSHION VEHICLES

[75] Inventor: Christopher Cockerell, Southampton, England

[73] Assignee: British Hovercraft Corporation Limited, Yeovil, England

[21] Appl. No.: 834,968

[22] Filed: Sep. 20, 1977

[30] Foreign Application Priority Data

Sep. 27, 1976 [GB] United Kingdom ............. 40053/76

[51] Int. Cl.$^2$ .............................................. B60V 1/04
[52] U.S. Cl. ................... 114/67 A; 180/126; 180/128
[58] Field of Search ............. 114/67 A; 180/124, 126, 180/127, 128; 244/23 C

[56] References Cited

U.S. PATENT DOCUMENTS

| 3,191,705 | 6/1965 | Jones et al. ................. 180/126 |
| 3,269,477 | 8/1966 | Hall ........................ 180/128 |
| 3,473,503 | 10/1969 | Gunther ................... 180/126 X |
| 3,532,180 | 10/1970 | Ford et al. ................ 180/126 |
| 3,621,932 | 11/1971 | Hythe et al. ............. 114/67 A X |
| 4,046,217 | 9/1977 | Magnuson .................. 180/126 |

FOREIGN PATENT DOCUMENTS

1226552  3/1971  United Kingdom ............... 180/124

OTHER PUBLICATIONS

Rohr Marine, Inc., Marine Engineering/Log, Mar. 1977.

Primary Examiner—Stephen G. Kunin
Attorney, Agent, or Firm—Larson, Taylor and Hinds

[57] ABSTRACT

A cushion containing seal particularly suited for use as the bow or stern seal on a large ocean-going sidewall air cushion vehicle or surface effect ship, comprises adjacent elongated stiff members arranged near to one of their ends for attachment to rigid structure of the vehicle so as to be deflectable for contour conformation. Escape of pressurized air from the cushion between adjacent elongated stiff members is substantially prevented by flexible impermeable members that permit the elongated members to deflect with respect to each other. The elongated stiff members may be manufactured from metal so as to be rigid.

30 Claims, 13 Drawing Figures

CUSHION SEALS FOR AIR CUSHION VEHICLES

This invention concerns cushion containing seals for air cushion supported vehicles, being especially applicable to cushion seals at the bow and the stern of air cushion vehicles of the sidewall type.

At the present time cushion containing seals for air cushion vehicles are manufactured from flexible impermeable sheet. One well known form of cushion seal comprises a first stage in the form of an inflatable bag projecting part way across the lateral boundary of the cushion, and a second stage formed by a series of separate channel-shaped sections of flexible material, known in the art as segments or fingers, attached to the first stage so as to project from the first stage across a further part of the cushion boundary. This form of cushion seal is used on both amphibious and sidewall air cushion vehicles. On sidewall air cushion vehicles it is generally used to form the seal between the sidewalls at the bow of the vehicle.

With the increasing size of projected vehicles of the sidewall type, also referred to as Surface Effect Ships (SES), difficulties arise in providing seals of flexible impermeable material having sufficient strength to carry operational loads, and having wear resistant properties sufficient to withstand long periods of operation in open seas. Seal constructions in the form of rigid doors have been proposed, but in operation these are too stiff to conform to the contours of the ground or waves passing beneath the vehicle and either leave large gaps through which the cushion air escapes or dig into the water, causing increased drag.

It is a requirement on such large ocean-going vehicles that the cushion seals at the bow and stern ends can be maintained and repaired whilst at sea. This requirement presents considerable problems. The known two-stage bag and finger skirt does not lend itself to repair from above. For example, should any of the fingers become damaged or worn to an extent that they need to be replaced whilst the vehicle is at sea, then considerable difficulties arise in detaching a finger from the bag and attaching a new finger to the bag from a position above the skirt. Complex and expensive retraction means are required so that the skirt can be retracted within the vehicle in order to effect the necessary repair.

It is an object of the present invention to provide a cushion seal particularly suited for use as the bow seal on a large ocean-going sidewall air cushion vehicle or surface effect ship, and which may also be used as the cushion seal at the stern of such vehicles.

A further object of the invention is to provide a cushion seal that facilitates repairs being effected to a seal whilst the vehicle is at sea.

Accordingly, in one aspect of the present invention a cushion containing seal for an air cushion vehicle comprises a plurality of adjacent elongated stiff members arranged near to one of their ends for attachment to rigid structure of an air cushion vehicle so as to be deflectable for contour conformation, the interspaces between adjacent elongated stiff members being closed by flexible impermeable members.

Each flexible impermeable member extends over substantially the complete length of the interspace between the two adjacent elongated stiff members and is positioned away from the surfaces of the elongated stiff members that face forward relative to the normal direction of travel of the vehicle so as to prevent the escape of cushion air whilst permitting the members to deflect with respect to each other.

By the expression "stiff members" we mean members that hold their shape by stiffness or semi-stiffness with no assistance from inflation air.

Preferably the elongated stiff members are shaped over their length so that when attached to an air cushion vehicle the lower end of each member trails the upper end relative to the normal direction of travel of the vehicle. Accordingly, whilst the members may be of any suitable curvature over their length, a preferred shape is one similar to a "j-shape."

In transverse cross-section the elongated stiff members may be of any suitable shape. Examples of some suitable shapes are circular, square or rectangular, trapezoidal, U-section, T-section and I-section.

The elongated stiff members may be of rigid construction, in which case they may be manufactured from any suitable metal, such as an aluminium or titanium alloy. Alternatively, they may be manufactured from composite materials such as carbon fibre or glass reinforced plastics.

At least those parts of the members that are in close proximity to the surface over which the vehicle is operating may be faced with hard-wearing material such as stainless steel. The hard-wearing material may be in the form of replaceable shoes.

If desired, the elongated stiff members may be of hollow construction and air may be passed through them so as to exit near their lower ends for air lubrication purposes. Air exit holes in the members may be provided with flexible flaps which permit air to flow from the holes whilst preventing the ingress of water.

In one form of the invention the flexible impermeable members closing the interspaces between the elongated stiff members may be formed by inflated elongated tubular members which are held in position by the elongated stiff members whilst not being fastened thereto.

In another form of the invention a flexible impermeable member may comprise a web of reinforced flexible material having opposed beaded edges that locate in suitably shaped recesses in the elongated stiff members. The beaded edges may be formed by steel cables that are encased by the web material.

A modification of this latter form of the invention has two webs sealed together at their edges and the space thus enclosed being filled with pressurized air so as to inflate the webs.

Whilst a cushion containing seal in accordance with the present invention is particularly suited for use as the seal at the bow of a sidewall air cushion vehicle or surface effect ship, it can also be used as the seal at the stern.

Accordingly, in another aspect the present invention provides an air cushion vehicle in which the sealing of the cushion is effected by rigid sidewalls and bow and stern deflectable seals, wherein at least one of said bow or stern seals comprises a plurality of adjacent elongated stiff members attached to the rigid body of the vehicle so as to be deflectable for contour conformation with a surface over which the vehicle operates, and a flexible impermeable member extending over substantially the complete length of the interspace between each pair of adjacent elongated stiff members so as to prevent escape of air from between the members whilst allowing individual members to deflect with respect to each other.

The flexible impermeable members are positioned so as to be away from the surfaces of the elongated stiff members that face forward relative to the normal direction of travel of the vehicle, and are thus protected by the elongated stiff members.

When the stern seal on the vehicle comprises a plurality of adjacent elongated stiff members, some of these members may carry water propulsion propellers. These propellers are mounted at the lower parts of the stiff members and are driven by shafts that extend downwardly from the vehicle either internally of the stiff members or so as to be carried in bearings mounted on the external surfaces of the stiff members. The drive shafts are flexibly coupled to power transmission means from a power source on the vehicle, so as to permit them to deflect with the elongated stiff members.

In one form of vehicle in accordance with the invention an additional cushion seal is provided aft of the bow seal but positioned so as to be in the forward half of the vehicle. The bow seal and the additional cushion seal are constructed from elongated stiff members so as to extend between the rigid sidewalls, thereby defining a cushion compartment that is forward of the main cushion area. The pressure of the air in this forward cushion compartment may be controlled so as to effect both trim and pitch control of the vehicle. The pressure in the forward cushion compartment may be varied by changing the speed and blade pitch of the lift fan supplying pressurized air to the compartment thus increasing or decreasing the pressure of the air being supplied. Alternatively, or additionally, means may be provided for venting the air in the forward cushion compartment to atmosphere when the pressure in the compartment exceeds a predetermined value. Control of the lift fan and the cushion venting means may be effected manually by the vehicle commander or automatically by a pressure sensor. The pressure sensor may sense the pressure in the forward compartment, or the differential between the pressure in the forward compartment and the pressure in the main cushion area. Furthermore, a duct having a controllable flap valve may be provided between the main cushion area and the forward cushion compartment, so that air can be vented from one to the other in a controlled manner.

Sensing means may be provided at the bow of the vehicle for sensing the profile and/or height of an approaching wave, a signal derived from the sensing means being used to operate means for varying the heights of the individual elongated stiff members so that the cushion seal is profiled to take account of approaching seas.

Various embodiments of the invention will now be described, by way of example only, with reference to the accompanying drawings, in which.

Figure 1:
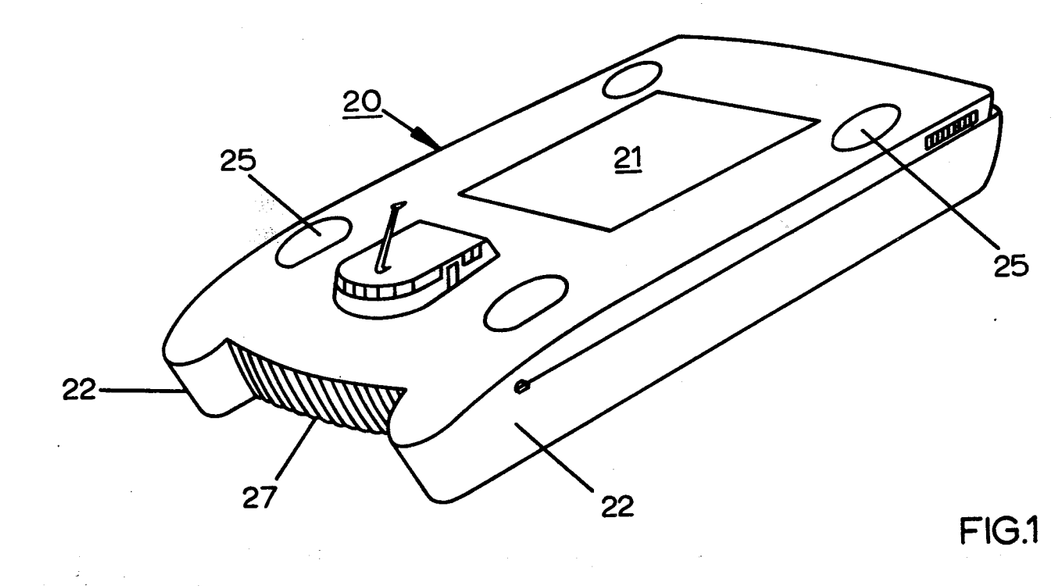
FIG. 1 is a perspective view of an air cushion vehicle in which sealing of the cushion is effected by rigid sidewalls and bow and stern deflectable seals.
Figure 2:
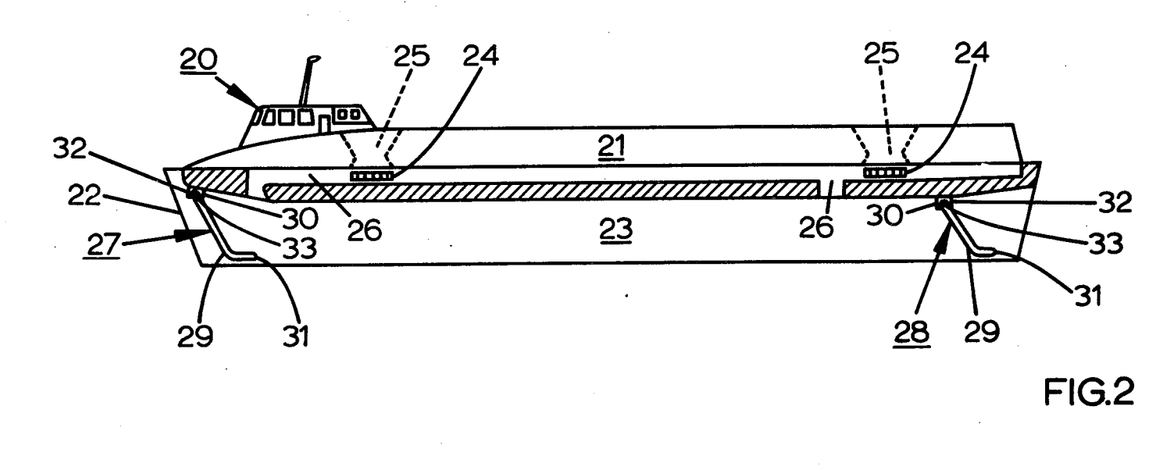
FIG. 2 is a longitudinal cross-section of the vehicle shown in FIG. 1, FIGS. 3, 4, 5, 6, 7 and 8 are transverse cross-sections through parts of various cushion containing seals in accordance with the invention.

An air cushion vehicle 20, illustrated in FIGS. 1 and 2, comprises a rigid body 21 and rigid sidewalls 22. The sidewalls 22 act as barriers to prevent lateral dissipation of a pressurized air cushion 23 by which the vehicle is supported. The pressurized air is supplied to the cushion 23 by lift fans 24 which take in ambient air through intake ducts 25. The pressurized air flows from fans 24 to the cushion 23 by way of ducts 26. Containment of the cushion 23 is completed by bow and stern seals 27 and 28, respectively, depending from the underside of the rigid body 21 of the vehicle 20 and extending generally normal to the longitudinal axis of the vehicle between the rigid sidewalls 22.

The seals 27 and 28 are constituted by a plurality of vertically elongated stiff members 29 deflectably attached at their upper ends 30 to the underside of the rigid body 21, and shaped over their length so that their lower ends 31 trail the upper ends 30 relative to the normal direction of movement of the vehicle. As is shown in FIG. 2 the members 29 may have a profile when viewed in side-elevation similar to a "j-shape." Each member is deflectably attached to a lug 32 by a hinge pin 33 such that it can be released and lifted upwardly either onto an outer deck or an internal deck of the vehicle for maintenance or replacement purposes.

The interspaces between adjacent elongated stiff members 29 are closed by flexible impermeable members (not shown in FIGS. 1 and 2) which prevent the escape of cushion air from between the members 29 whilst permitting the members to deflect with respect to each other.

FIGS. 3 to 8 show transverse cross-sections through adjacent pairs of elongated stiff members 29 and a flexible impermeable member closing the interspace between them, in various forms of cushion seals in accordance with the invention.

Figure 3:
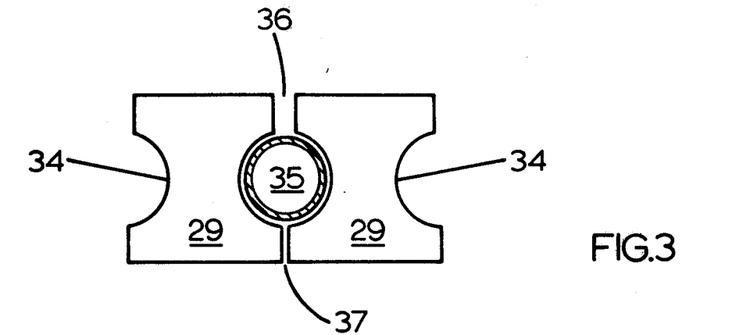

The stiff members 29 shown in FIG. 3 approximate to a square in transverse cross-section, but have semi-circular grooves 34 formed in those sides of each member 29 that are adjacent to sides of other members 29. A flexible impermeable member in the form of an inflated tubular member 35, manufactured from reinforced flexible material, is located in the space that is formed by the grooves 34 in the two adjacent sides of the stiff members 29. The space 36 between the stiff members 29 on the cushion facing side is of larger dimension than the spaces on the opposite side so that cushion pressure can act on the inflated member 35 to bias it into a sealing position against the space 37, whilst at the same time permitting relative movement between the stiff members 29.

Figure 4:
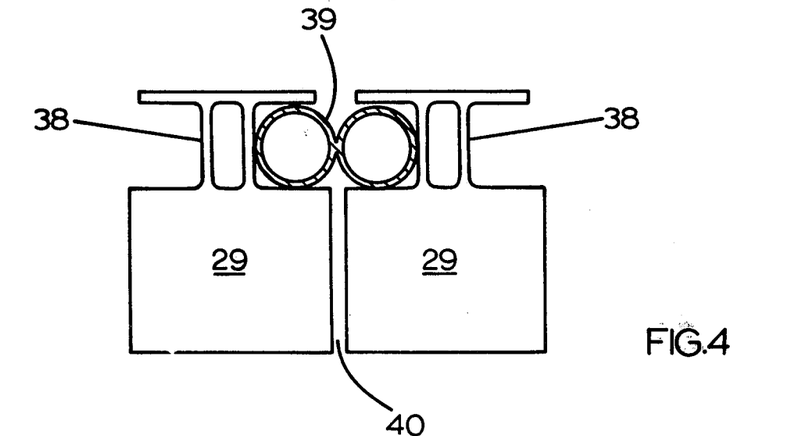

In FIG. 4 the stiff members 29 are substantially rectangular in transverse cross-section with substantially T-sectioned extensions 38 on their cushion facing sides. The extensions 38 on adjacent members 29 co-operate together to hold in position a flexible impermeable member 39 formed from two integral inflated tubular members which act to close the space 40 between the adjacent members 29.

Figure 5:
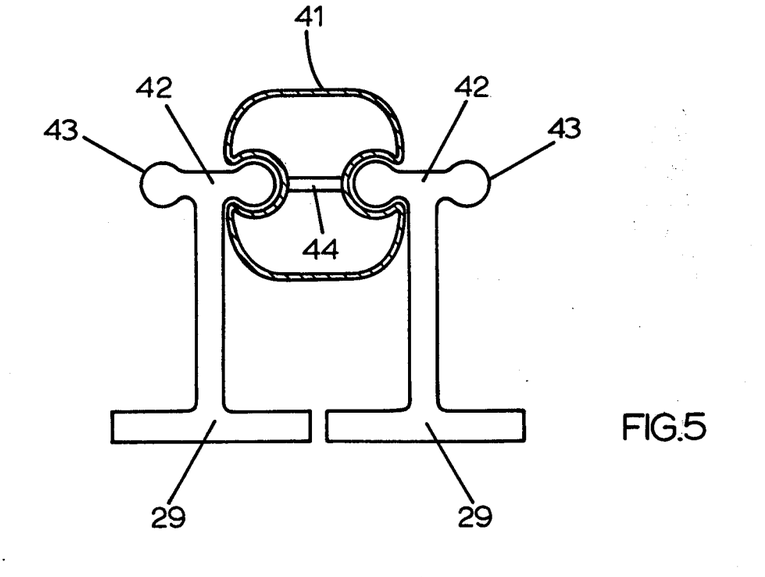

The transverse cross-section of the stiff members 29 shown in FIG. 5 approximates to an I-section. A flexible impermeable member in the form of an inflated pillow 41 is held between the flanges 42 of the I-section members 29 that face the cushion area. The longitudinally extending edges 43 of these flanges 42 are of substantially circular section so as to locate with correspondingly shaped recesses in the pillow member 41 and to reduce wear due to movement between the I-section members and the pillow members. To further reduce wear between these members the edges 43 may be coated with rubber or some other suitable material. The inflated pillow 41 is provided throughout its length with internal tie members 44 that serve to hold it in the desired shape against the action of the pressurized air with which it is inflated.

Figure 6:
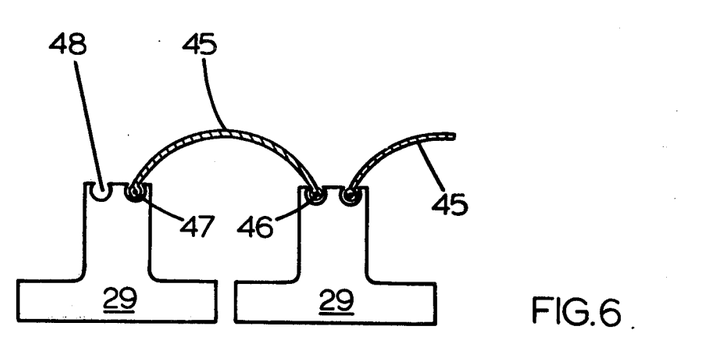

The stiff members 29 in FIG. 6 are formed as T-sections and escape of cushion air is prevented by flexible impermeable web members 45 extending between adjacent members 29. Each web member 45 is manufactured from reinforced flexible material, such as natural or neoprene rubber sheet reinforced with woven or knitted nylon fabric, and is attached to the stiff members by opposed beaded edges 46 and 47 that are located in recesses 48 in the T-section stiff members 29. This arrangement facilitates removal of a worn web member 45 from a position above the seal since the beaded edges 46 and 47 can be pulled through the recesses 48, and the beaded edges of a new web member can be passed into the recesses from above to place the new web member in position.

Figure 7:
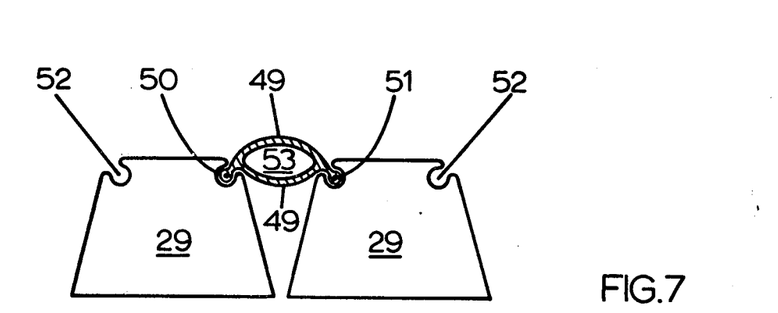

The stiff members 29 in FIG. 7 are trapezoidal in transverse cross-section, and the escape of cushion air between the members is prevented by an impermeable member formed from two webs 49 of flexible reinforced material extending between beaded portions 50 formed around steel cables 51 and housed in longitudinally extending recesses 52 in the stiff members 29. The space 53 between the webs 49 may be inflated when the impermeable member is in position.

Figure 8:
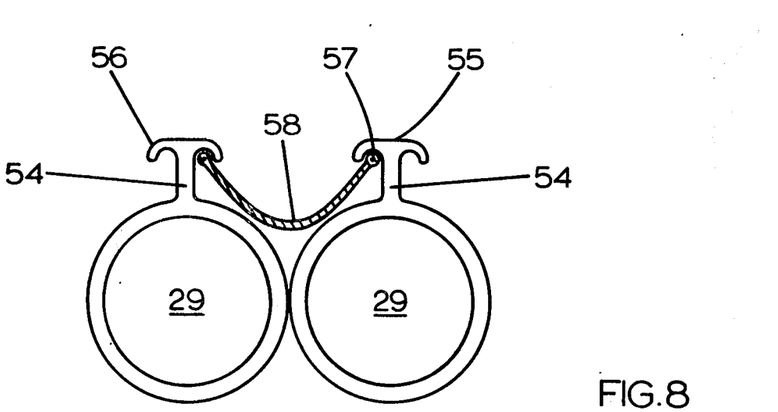

In FIG. 8 the stiff members 29 are circular in transverse cross-section and have generally T-shaped projections 54 extending outwardly from those parts of the members 29 that face the cushion area. The webs 55 of the T-shaped projections 54 have curled edge portions 56 which serve to locate the beaded edges 57 of a flexible impermeable web member 58 extending between the adjacent stiff members 29 to prevent the escape of cushion air from therebetween.

All of the members 29 of the various forms of cushion seals illustrated in FIGS. 3 to 8 inclusive, have sufficient stiffness that they are able to maintain their formed operational shape without assistance from inflation air or other external means. At the same time they are able to deflect about their pivotal attachments to the rigid body of an air cushion vehicle when they come into contact with a water surface over which the vehicle is operating. Thus the members 29 may be manufactured from a metal having suitable characteristics to withstand a marine environment, such as, for example, a suitably protected aluminium or titanium alloy. Alternatively, they may be manufactured from suitable composite materials such as carbon fibre or glass fibre reinforced epoxy resins.

Figures 9, 10:
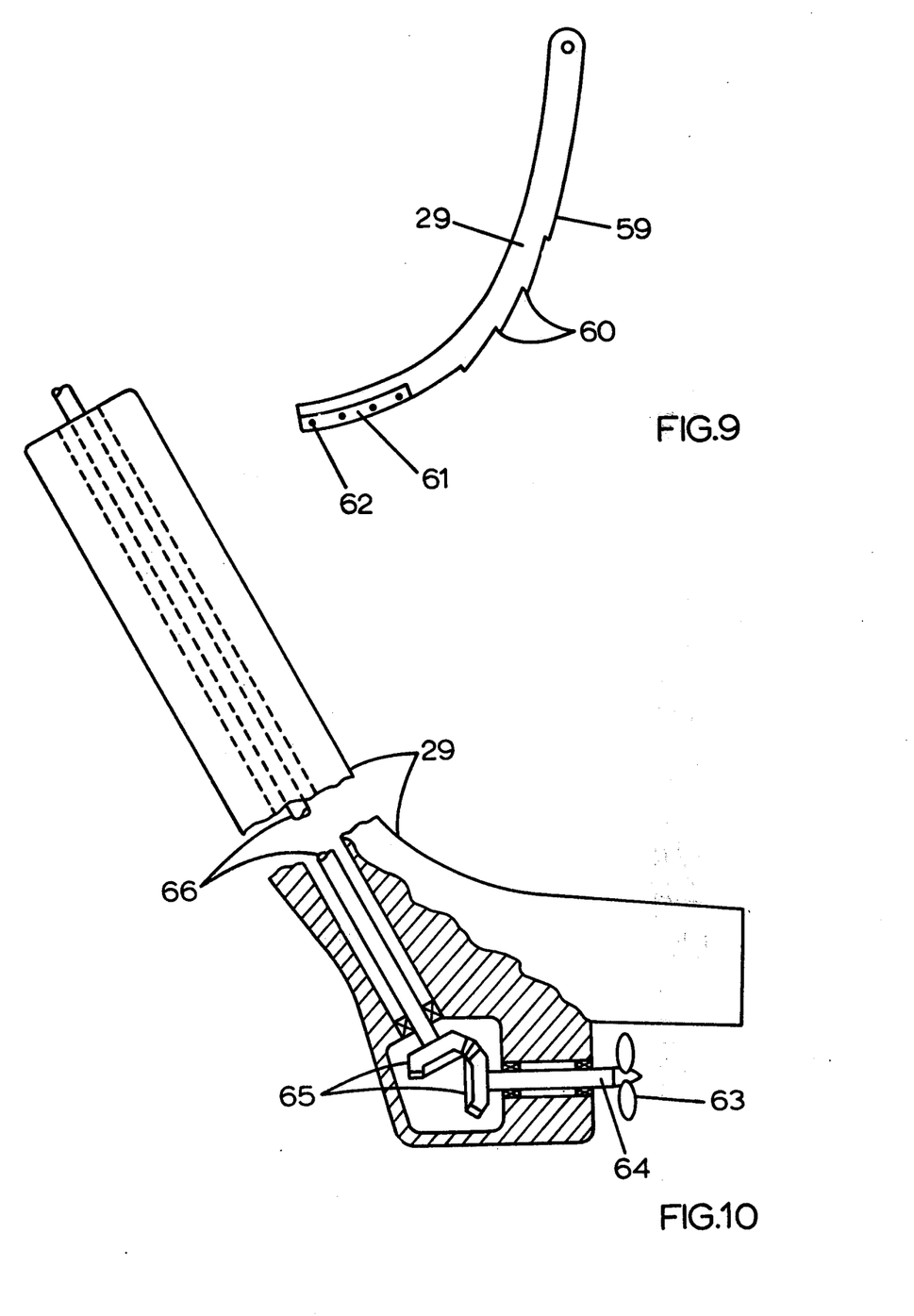
FIG. 9 is a side elevation of an individual elongated stiff member in a further embodiment of the invention.
FIG. 10 is a side elevation of an individual elongated stiff member in accordance with another embodiment of the invention.

Particularly in the case of a cushion seal intended for use at the bow of the vehicle, the forward facing surface 59 of each elongated stiff member 29 may be formed with a plurality of steps 60, as shown in FIG. 9. These steps 60 act to break up the flow of water over the surface 59, hence reducing drag when the member comes into contact with a wave.

As is further shown in FIG. 9, at least the lower part of the forward facing surface 59 of the member 29 which in operation is in close proximity to the water surface may be provided with a shoe 61 manufactured from a material having a high resistance to abrasion, such as stainless steel. The shoe 61 is fixed to the member 29 by rivets 62, or other suitable fastening means, so that it may be replaced when it becomes worn. If desired, the shoes, or a plurality of shoes, may extend over the complete length of the surface 59.

Figure 12:
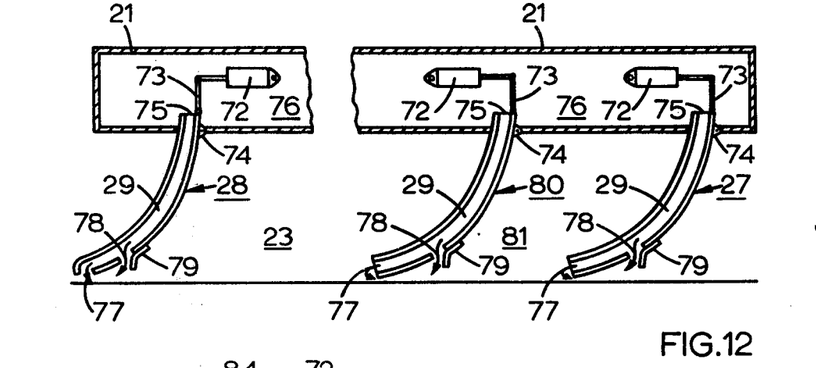
FIG. 12 is a schematic longitudinal cross-section through part of an air cushion vehicle in yet another embodiment of the invention.

The elongated stiff members 29 in any of the forms of cushion seals shown in FIGS. 3 to 8 inclusive, may be of hollow configuration to facilitate pressurized air being passed downwardly therethrough to exit at lower ends, or from holes in the forward facing surfaces near to their lower ends, for air lubrication purposes, is further illustrated in the embodiment of FIG. 12.

The elongated stiff member 29 illustrated in FIG. 10 is particularly suited for use as part of the cushion seal at the aft end of a vehicle. The member 29 is provided at its lower end with a water propulsion propeller 63 carried on a shaft 64. The shaft 64 is geared by a suitable gearing arrangement 65 to a drive shaft 66 that extends downwardly through the stiff member 29. The upper end of the drive shaft 66 extends from the upper end of the stiff member into the rigid body of the vehicle (not shown), where it is connected by a suitable flexible coupling arrangement (not shown) to power transmission means from a power source on the vehicle so that the shaft 66 is able to move with the stiff member 29 when it is deflected.

A large air cushion vehicle such as shown in FIGS. 1 and 2 and designed to cruise at 40 knots may have a weight in the order of 10,000 tons, an overall length dimension in the order of 400 feet, and an overall beam dimension in the order of 200 feet. For a vehicle of this size each elongated stiff member making up the bow and stern cushion seals will have a height dimension in the order of 20 feet and a width dimension in the order of 3 feet.

It will be desirable to provide a biasing force to balance each stiff member in a cushion sealing position against the action of the cushion pressure, and additionally to provide a restoring force to return the member to this position after it has been deflected.

Figure 11:
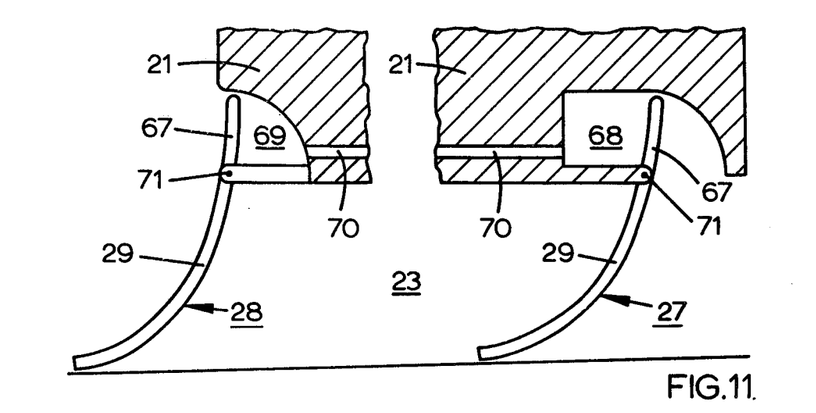
FIG. 11 is a schematic longitudinal cross-section through the bow and stern of an air cushion vehicle having cushion sealing means in another embodiment of the invention.

FIG. 11 shows one means of providing a biasing force to balance the bow and stern cushion seals 27 and 28, respectively, in their cushion sealing positions against the action of the pressurized air forming the cushion 23. Upward extensions 67 of the members 29 forming the bow and stern cushion seals enclose with the rigid body 21 a space 68 at the forward end of the vehicle and a space 69 at the aft end of the vehicle. The spaces 68 and 69 are supplied with pressurized air through ducts 70. Taking into account the respective areas of the seals 27 and 28 that are above and below the hinge lines 71 of the seals on the rigid body 21, the air pressure in the spaces 68 and 69 is maintained sufficiently above cushion pressure to balance the seals 27 and 28 in their cushion sealing positions and to provide a restoring force when the members 29 are deflected by contact with the water surface.

Alternative means of balancing the cushion seals against the action of cushion pressure and of providing a restoring force when the seals are deflected, is shown in the embodiment of the invention illustrated in FIG. 12. In this embodiment the bow and stern cushion seals 27 and 28, respectively, each comprise a plurality of elongated stiff members 29 of tubular form so that each seal is of similar construction to the seal hereinbefore described with reference to FIG. 8 of the accompanying drawings. Jacks 72, that may be hydraulic or pneumatic, operate on upward extensions 73 of the members 29 which are deflectably attached at hinge points 74 to the rigid body 21 of the vehicle (not shown in full). The open upper ends 75 of the tubular members 29 are in communication with a plenum chamber 76 formed by structure of the rigid body 21. Pressurized air from lift fans (not shown) is supplied to the plenum chamber 76, and passes downwardly through the tubular members 29 to exit from their lower ends 77, and from additional orifices 78 provided in the forward facing surfaces of the members 29, to air lubricate the lower parts of the members 29. Hinged or flexible flaps 79 are provided on the members 29 to prevent ingress of water through the orifices 78, whilst permitting air to exit from the orifices.

FIG. 12 further discloses the provision of an additional cushion seal 80 aft of the bow cushion seal 27 but positioned so as to be on the forward half of the vehicle. The additional cushion seal 80 is of similar construction to the bow and stern seals 27 and 28, respectively. By this arrangement a cushion compartment 81 is provided forward of the main cushion area 23. The air pressure in the forward cushion compartment 81 can be adjusted to control pitching of the vehicle during operations or to correct the trim of the vehicle to compensate for uneven load distribution. Thus, for instance when the vehicle is in normal trim, the pressure in the forward cushion compartment 81 may be maintained at a value less than the pressure in the main cushion area 23. If the vehicle pitches bow downwards, the pressure in the forward cushion compartment 81 will increase by reason of compression of the trapped air, providing a righting force on the underside of the vehicle. The righting force available at such a time depends upon spacing of the two seals 27 and 80, respectively.

Alternatively, the pressure of the air in the forward compartment 81 may be controlled dynamically to adjust the trim of the vehicle, and to effect control of pitching movements when the vehicle is operational. Adjustment of the air pressure in the forward cushion compartment 81 may be achieved by controlling those characteristics of the lift fan that effect pressure and rate of flow, such as, for example, rotational speed and blade pitch. Further control of the pressure in the forward compartment 81 may be achieved by the provision of means for venting air from the forward compartment to atmosphere, should a predetermined pressure be exceeded. Such vent means may comprise one or more ducts extending through the rigid body of the vehicle between the forward compartment and atmosphere, and arranged in normal operation to be closed by valves which open when a predetermined pressure in the cushion compartment is exceeded. The pressure differential between the main cushion area 23 and the forward cushion compartment may be further adjusted by allowing air to flow from one to the other through an interconnecting duct within the rigid body of the vehicle, the duct being provided with a selectively operable valve for controlling the flow of air through it, or closing it completely.

Control of the fan speed, the pitch of the fan blades, the vent valves and the selectively operable valve may be effected manually by the commander of the vehicle. Alternatively, a pressure sensing device may be provided and a signal derived from this device may be used for control purposes. The pressure sensing device may sense the pressure of the air in the forward cushion compartment, or it may sense the differential between the pressure in the forward cushion compartment and the pressure in the main cushion area.

A further advantage of the embodiment shown in FIG. 12 is that by using the two cushion seals 27 and 80 the function of cushion containment at the vehicle bow is shared so that the stresses in the elongated stiff members 29 forming these seals are less than those in a single row of members performing the same containment function.

Figure 13:
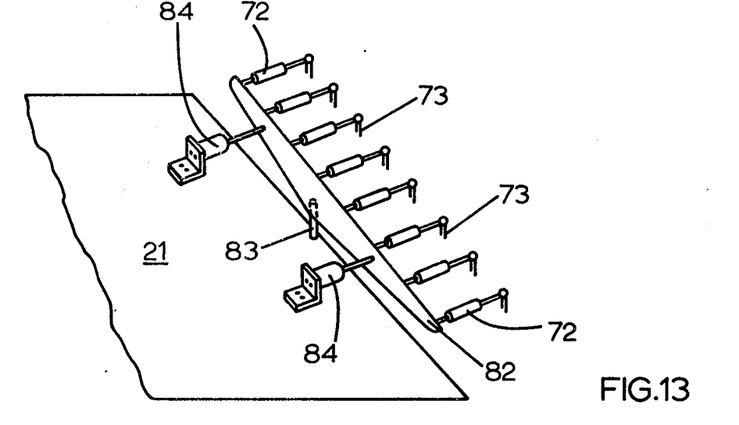
FIG. 13 is a perspective view of a method of biasing a plurality of elongated stiff members making up a cushion seal.

FIG. 13 shows an arrangement for biasing the individual elongated stiff members (not shown) by connecting jacks 72 to an upward extension 73 of each stiff member. By connecting the jacks 72 to a beam 82 that is pivoted about a point 83 on the rigid body structure 21, and connecting further jacks 84 between the beam 82 and the structure 21, on either side of the pivot point 83, a differential bias can be given to the elongated stiff members making up the cushion seal. This differential bias can be used to control rolling motion of the vehicle. Furthermore, a signal from means (not shown) sensing the profile of an approaching wave, may be used to produce control signals for operating the jacks 84 so that the elongated stiff members can be biased to a profile best suited to that of the approaching wave.

Of course the embodiments of the invention hereinbefore described with reference to and as shown in the accompanying drawings are by way of example only, modifications being possible without departing from the scope of the invention. For instance, the various flexible impermeable members for closing the interspaces between the elongated stiff members, as described with reference to and shown in FIGS. 3 to 8 of the accompanying drawings, are not limited to use with elongated stiff members having the particular transverse cross-section with which they are shown. They may be used with elongated stiff members having other transverse cross-sections.

Moreover, the elongated stiff members described with reference to and shown in the embodiment of FIG. 12, need not be circular in transverse cross-section, they may be of any suitable cross-section.

I claim as my invention:

1. A cushion containing seal for an air cushion vehicle comprising,
   a plurality of elongated stiff members,
   means for attaching each said stiff member adjacent one end thereof to rigid structure of the air cushion vehicle,
   sealing means cooperating with adjacent elongated stiff members for sealing the interspace between members against the escape of cushion air therethrough, said sealing means extending substantially from one end of said members to the other end thereof,
   said sealing means disposed between each pair of elongated stiff members comprising at least one flexible impermeable member whereby each said elongated stiff member may deflect with respect to the next adjacent stiff member by movement about said attaching means to the vehicle rigid structure.

2. A cushion seal as claimed in claim 1, wherein each flexible impermeable member closing the interspace between two adjacent elongated stiff members is formed by an inflated elongated tubular member held in position by the elongated stiff member while not being fastened thereto.

3. A cushion seal as claimed in claim 1, wherein each flexible impermeable member closing the interspace between two adjacent elongated stiff members comprises a web of flexible reinforced material having opposed beaded edges located in recesses in the elongated stiff members.

4. A cushion seal as claimed in claim 1, wherein each flexible impermeable member closing the interspace between two adjacent elongated stiff members comprises two webs of flexible reinforced material sealed together at their edges and being attached to the elongated stiff members by beaded edges that locate in recesses in the elongated stiff members, the space enclosed by the webs being pressurized so as to inflate the flexible impermeable member.

5. A cushion seal as claimed in claim 1, wherein each elongated stiff member is shaped so that the lower end of the member trails the upper end relative to the normal direction of travel of the vehicle.

6. A cushion seal as claimed in claim 5, wherein each elongated stiff member has a side profile that resembles a "j-shape."

7. A cushion seal as claimed in claim 1, wherein the elongated stiff members are manufactured from metal.

8. A cushion seal as claimed in claim 1, wherein the elongated stiff members are manufactured from a composite material.

9. A cushion seal as claimed in claim 1, wherein at least that part of each elongated stiff member that is in close proximity to a surface over which the vehicle is operating is faced with a hard-wearing material.

10. A cushion seal as claimed in claim 9, wherein the hard-wearing material is in the form of a replaceable shoe.

11. A cushion seal as claimed in claim 1, wherein the elongated stiff members are hollow.

12. A cushion seal as claimed in claim 11, wherein the elongated stiff members are provided with exit holes near their lower ends so that in operation air may be passed downwardly through the members to exit at the lower ends.

13. A cushion seal as claimed in claim 12, wherein the exit holes are provided with flexible flaps that permit air to flow from the exit holes, while preventing water from entering into the members.

14. An air cushion vehicle including rigid sidewalls and bow and stern deflectable seals, at least one of said deflectable seals comprising, a plurality of elongated stiff members, means for attaching each said stiff member adjacent one end thereof to rigid structure of the air cushion vehicle, sealing means cooperating with adjacent elongated stiff members for sealing the interspace between members adjacent the excape of cushion air therethrough, said sealing means extending substantially from one end of said members to the other end thereof, said sealing means disposed between each pair of elongated stiff members comprising at least one flexible impermeable member whereby each said elongated stiff member may deflect with respect to the next adjacent stiff member by movement about said attaching means to the vehicle rigid structure.

15. An air cushion vehicle as claimed in claim 14, wherein the stern seal comprises a plurality of elongated stiff members and at least some of these members carry water propulsion propellers, each propeller being mounted on the lower part of an elongated stiff member and being driven by a shaft that extends downwardly from the vehicle so as to be carried by the elongated stiff member, the drive shaft being flexibly coupled to power transmission means from a power source on the vehicle, so as to permit it to deflect with the elongated stiff member.

16. An air cushion vehicle as claimed in claim 14, wherein an additional cushion seal extends between the sidewalls on the forward half of the vehicle so as to define with the bow seal a cushion compartment that is forward of the main cushion area.

17. An air cushion vehicle as claimed in claim 16, wherein the bow seal and the additional seal comprises a plurality of adjacent elongated stiff members.

18. An air cushion vehicle as claimed in claim 16, wherein means are provided for controlling the pressure in the forward cushion compartment so as to effect both trim and pitch control of the vehicle.

19. An air cushion vehicle as claimed in claim 18, wherein the pressure in the forward cushion compartment is varied by controlling the speed and the blade pitch of at least one lift fan supplying pressurized air to the compartment.

20. An air cushion vehicle as claimed in claim 19, wherein control of the lift fan is effected by a pressure sensor that senses pressure in the forward cushion compartment.

21. An air cushion vehicle as claimed in claim 16, wherein vent means are provided for venting air from the forward cushion compartment when the pressure in the compartment exceeds a predetermined value.

22. An air cushion vehicle as claimed in claim 21, wherein the vent means are controlled by a pressure sensor that senses pressure in the forward cushion compartment.

23. An air cushion vehicle as claimed in claim 21, wherein the vent means comprises a duct and a variable valve means in the duct, said valve means being movable between a position in which the duct is closed and a position in which the forward and main cushion areas are placed in communication with each other by way of the duct.

24. An air cushion vehicle as claimed in claim 14, wherein means are provided for biassing the elongated stiff members towards a cushion sealing position against the action of pressurized air forming the cushion.

25. An air cushion vehicle as claimed in claim 24, wherein said biassing means are provided by extensions of the elongated stiff members beyond their connection wih rigid body structure of the vehicle so as to enclose with the rigid body structure a space that is pressurized, whereby a force is exerted on the extensions of the elongated stiff members tending to bias said members toward a cushion sealing position.

26. An air cushion vehicle as claimed in claim 25, including means for providing a restoring force to the elongated stiff members after they have been deflected.

27. An air cushion vehicle as claimed in claim 26, wherein said means for biassing the elongated stiff members towards a cushion sealing position and said means for providing a restoring force to said members after deflection, comprise jacks operating on extensions of said members beyond their connection to rigid body structure of the vehicle.

28. An air cushion vehicle as claimed in claim 14, wherein means are provided for applying a differential bias to the individual elongated stiff members.

29. An air cushion vehicle as claimed in claim 20, wherein said means for applying differential bias comprises jacks connected between extensions of the elongated stiff members beyond their connection to rigid body structure of the vehicle and a beam that is pivotally attached to the rigid body structure of the vehicle, and two further jacks connected, one on either side of the pivotal attachment of the beam, between the beam and rigid body structure of the vehicle.

30. An air cushion vehicle as claimed in claim 28, wherein sensing means at the bow of the vehicle sense the profile and height of an approaching wave and produce control signals for operating said differential biasing means whereby the cushion seal is profiled to take account of approaching seas.

* * * * *